(12) United States Patent
Nobuoka et al.

(10) Patent No.: US 10,338,627 B2
(45) Date of Patent: Jul. 2, 2019

(54) VEHICLE INTERIOR STRUCTURE

(71) Applicant: MAZDA MOTOR CORPORATION, Hiroshima (JP)

(72) Inventors: Shunsuke Nobuoka, Hiroshima (JP); Chikara Sato, Hiroshima (JP); Ryosuke Matsuo, Hatsukaichi (JP); Hitoshi Ochimizu, Higashihiroshima (JP); Ryo Oyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/086,986

(22) PCT Filed: Feb. 7, 2018

(86) PCT No.: PCT/JP2018/004211
§ 371 (c)(1),
(2) Date: Sep. 20, 2018

(87) PCT Pub. No.: WO2018/150976
PCT Pub. Date: Aug. 23, 2018

(65) Prior Publication Data
US 2019/0050017 A1    Feb. 14, 2019

(30) Foreign Application Priority Data

Feb. 17, 2017   (JP) ................................. 2017-027675

(51) Int. Cl.
*G05G 1/32*        (2008.04)
*B60K 37/04*       (2006.01)
(Continued)

(52) U.S. Cl.
CPC ............... *G05G 1/32* (2013.01); *B60K 23/02* (2013.01); *B60K 37/00* (2013.01); *B60K 37/04* (2013.01);
(Continued)

(58) Field of Classification Search
CPC ............ G05G 1/30; G05G 1/32; G05G 1/327; G05G 1/44; G05G 1/445; G05G 5/00;
(Continued)

(56) References Cited

U.S. PATENT DOCUMENTS

2005/0103151 A1*  5/2005  Yoon ........................ G05G 1/30
                                                     74/512
2009/0200784 A1*  8/2009  Braun .................... B62D 25/14
                                                     280/779

(Continued)

FOREIGN PATENT DOCUMENTS

JP         2009-001149 A      1/2009
JP         2009-237844 A     10/2009
(Continued)

OTHER PUBLICATIONS

International Search Report issued in PCT/JP2018/004211; dated Apr. 17, 2018.

*Primary Examiner* — Prasad V Gokhale
(74) *Attorney, Agent, or Firm* — Studebaker & Brakett PC

(57) ABSTRACT

A vehicle interior structure includes a pedal-backward-preventive bracket against which a supporting portion of a control panel abuts when the control pedal controlled by a foot of a driver moves backward, the pedal-backward-preventive bracket being fixed to an instrumental panel support member extending in a vehicle width direction, a mount bracket on which a head-up display is mounted, the mount bracket being fixed to the instrumental panel support member, and a load transfer portion that is provided between the pedal-backward-preventive bracket and the mount bracket to transfer a rearward load input to the pedal-backward-preventive bracket to the mount bracket via the supporting portion.

12 Claims, 10 Drawing Sheets

FRONT ←——→ REAR

(51) Int. Cl.
    *B60K 23/02*     (2006.01)
    *B62D 25/08*     (2006.01)
    *B60T 7/06*      (2006.01)
    *G05G 1/445*     (2008.04)
    *B62D 25/14*     (2006.01)
    *B60K 37/00*     (2006.01)

(52) U.S. Cl.
    CPC .............. *B60T 7/065* (2013.01); *B62D 25/08* (2013.01); *B62D 25/14* (2013.01); *G05G 1/445* (2013.01)

(58) Field of Classification Search
    CPC . G05G 5/02; G05G 5/04; B60K 23/02; B60K 37/00; B60K 37/04; G02B 27/01; G02B 27/017; B60T 7/06; B60T 7/065; B62D 25/14
    See application file for complete search history.

(56) References Cited

U.S. PATENT DOCUMENTS

| | | | |
|---|---|---|---|
| 2015/0168986 A1 | 6/2015 | Kim | |
| 2015/0329089 A1* | 11/2015 | Kitaguchi | ................ G05G 1/32 74/512 |
| 2016/0200366 A1 | 7/2016 | Sanjo | |
| 2017/0101079 A1* | 4/2017 | Kawaguchi | ............... B60T 7/06 |

FOREIGN PATENT DOCUMENTS

| | | |
|---|---|---|
| JP | 2015-051706 A | 3/2015 |
| WO | 2017/051780 A1 | 3/2017 |

\* cited by examiner

FRONT ←——————→ REAR

LEFT ←——→ RIGHT

VEHICLE INTERIOR STRUCTURE

TECHNICAL FIELD

The present invention relates to a vehicle interior structure.

BACKGROUND ART

As described in Patent Literature 1, a vehicle typically has a pedal-backward-preventive mechanism that prevents a control pedal (in particular, a braking pedal) controlled by a foot of a driver from moving backward further than a predetermined dimension when a forward collision occurs.

More vehicles produced nowadays have been equipped with a head-up display that presents various types of information in front of a driver as described in Patent Literature 2.

The pedal-backward-preventive mechanism usually includes a pedal-backward-preventive bracket that is fixed to an instrumental panel support member (also referred to as a steering support member) serving as a strength member. When the control pedal moves backward in a forward collision, a supporting portion of the control pedal abuts the pedal-backward-preventive bracket and thereby the control pedal comes off, for example. In this manner, the control pedal is prevented from moving backward further than a predetermined dimension.

The pedal-backward-preventive bracket described above needs to hold a large rearward load and thus is required to have sufficient impact resistance. To increase impact resistance, it is not preferable to simply increase a thickness or a size of the pedal-backward-preventive bracket, because the size or weight of the pedal-backward-preventive bracket is increased.

CITATION LIST

Patent Literature

Patent Literature 1: JP 2009-237844 A
Patent Literature 2: JP 2009-1149 A

SUMMARY OF INVENTION

The present invention is made in view of the problem described above. An object of the present invention is to provide a vehicle interior structure that includes a pedal-backward-preventive bracket that undergoes no or little increase in size and/or weight and has sufficient impact resistance.

The vehicle interior structure according to the present invention includes an instrumental panel support member to which an instrumental panel is fixed, the instrumental panel support member extending in a vehicle width direction, a pedal-backward-preventive bracket against which a supporting portion of a control pedal abuts when the control pedal controlled by a foot of a driver moves backward, the pedal-backward-preventive bracket being fixed to the instrumental panel support member, a mount bracket on which a head-up display is mounted, the mount bracket being fixed to the instrumental panel support member, and a load transfer portion that is provided between the pedal-backward-preventive bracket and the mount bracket to transfer a rearward load input to the pedal-backward-preventive bracket to the mount bracket via the supporting portion.

DESCRIPTION OF EMBODIMENTS

A vehicle interior structure according to a first embodiment of the present invention will be described with reference to FIGS. 1 to 6. In the following description, "front", "rear", "right", and "left" respectively correspond to "front", "rear", "right", and "left" of a vehicle unless specified.

Figure 1:
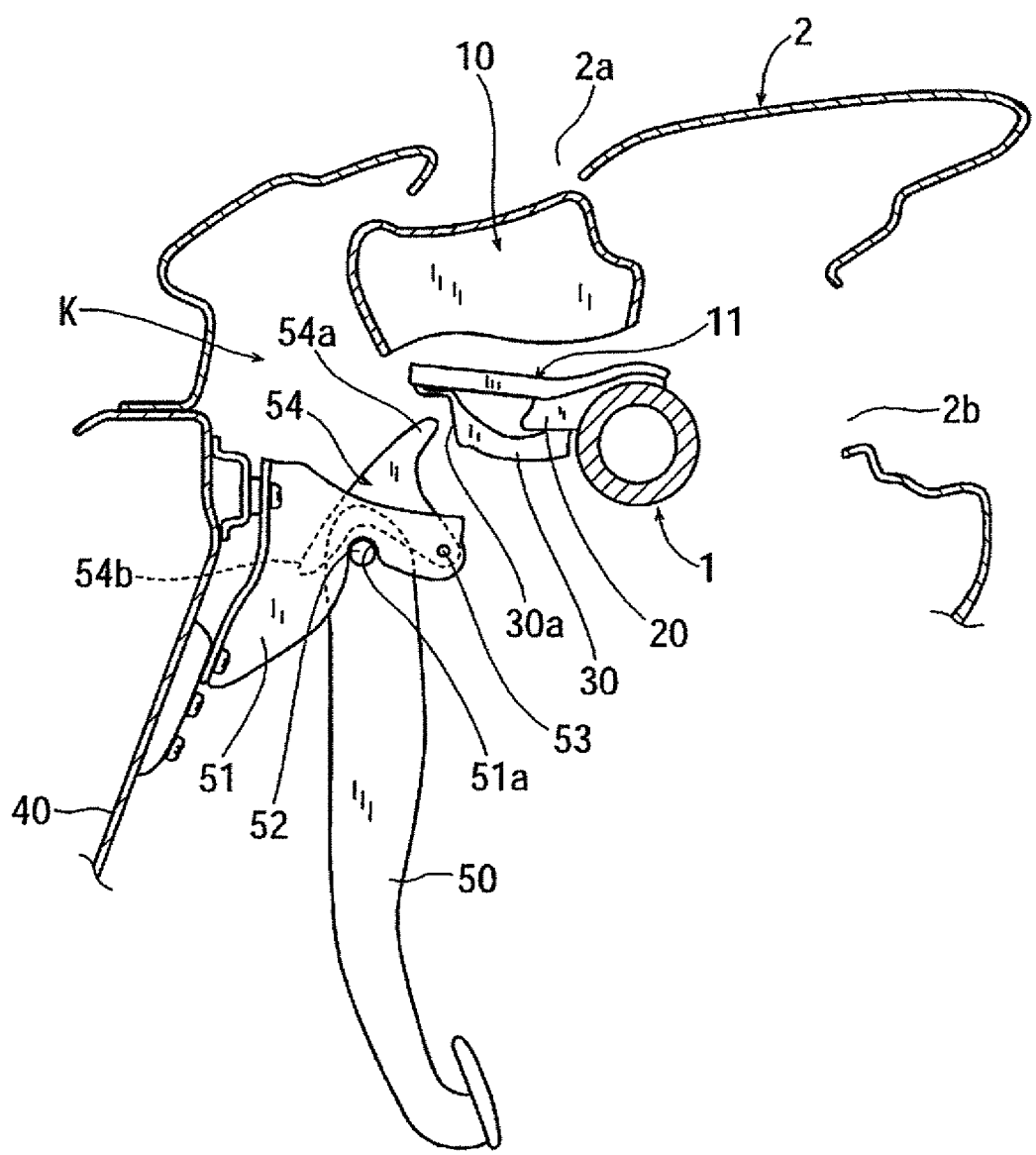
FIG. 1 is a side sectional view of a vehicle interior structure according to a first embodiment of the present invention.

In FIG. 1, reference sign 1 indicates an instrumental panel support member which is a vehicle body strength member extending in a vehicle width direction. The instrumental panel support member 1 connects between a pair of right and left hinge pillars (not shown) and also supports a steering shaft (not shown).

An instrumental panel 2 is fixed to the instrumental panel support member 1. A head-up display 10 is provided in the instrumental panel 2 at an appropriate position with respect to a driver's seat. The head-up display 10 projects various types of information presented to a driver onto a region forward of a windshield through an opening 2a provided in the instrumental panel 2. Reference sign 2b in FIG. 1 indicates an opening in which a meter panel (meter unit) such as a speed meter is installed.

Figure 2:
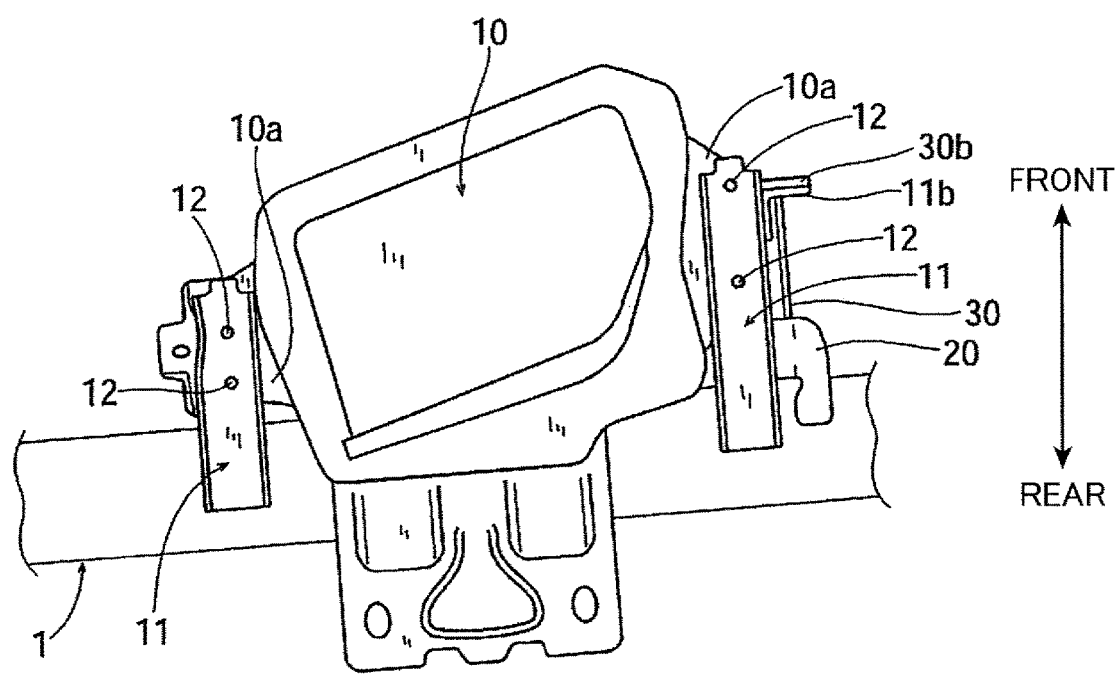
FIG. 2 is a plan view illustrating a mounted state of a head-up display.

As illustrated in FIG. 2, the head-up display 10 is detachably mounted by first fasteners 12, such as bolts, on a pair of right and left mount brackets 11 that is fixed (is welded, for example) to the instrumental panel support member 1. Specifically, the head-up display 10 has flanges 10a used for mounting. The flanges 10a are placed on bottom faces of the mount brackets 11 and fixed to the mount brackets 11 by the first fasteners 12 such as bolts handled (turned) from below. In FIGS. 3 to 6, reference sign 11a indicates a hole provided in the mount bracket 11 used for the first fastener 12.

Figure 3:
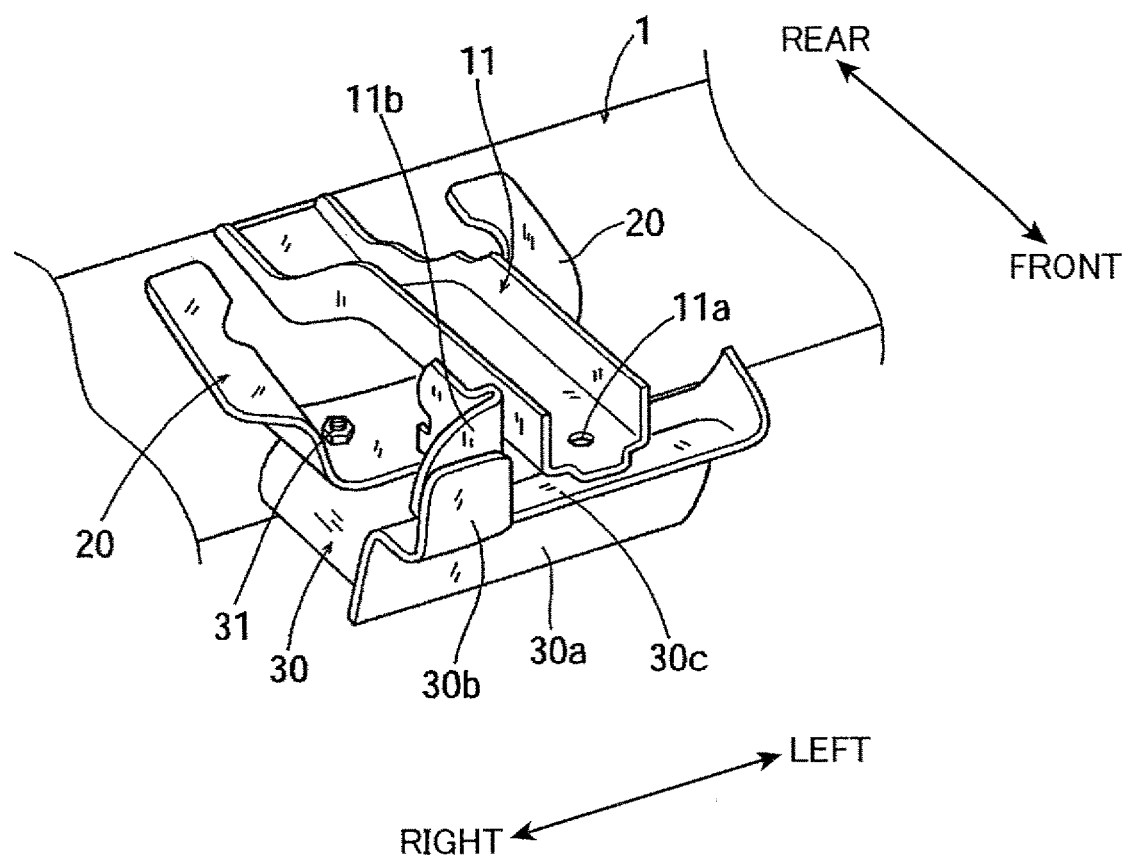
FIG. 3 is a top perspective view illustrating a relationship between a mount bracket and a pedal-backward-preventive bracket.

The mount bracket 11 is made by, for example, bending an iron-based metal plate. As illustrated in FIGS. 1 to 3, the mount bracket 11 is fixed to an upper portion of the instrumental panel support member 1 and extends in front of the instrumental panel support member 1. The head-up display 10 is mounted on the mount bracket 11 to largely protrude forward from the instrumental panel support member 1.

One of the pair of right and left mount brackets 11 (the mount bracket 11 in the right side in FIG. 2) has a pressure receiving portion 11b on a side face of a front end. The pressure receiving portion 11b is provided by integrating a receiving plate with the mount bracket 11 by welding, for example, the receiving plate being made by working an iron-based metal plate. A braking pedal 50, which will be described later, is disposed below the mount bracket 11 having the pressure receiving portion 11b (in FIG. 2, the braking pedal 50 is hidden behind the head-up display 10).

The pedal-backward-preventive bracket 30 is fixed to the instrumental panel support member 1 via a base bracket 20. The pedal-backward-preventive bracket 30 is disposed below the mount bracket 11 having the pressure receiving portion 11b. The base bracket 20 is made by, for example, working an iron-based metal plate and fixed (welded, for example) to the instrumental panel support member 1.

Figure 6:
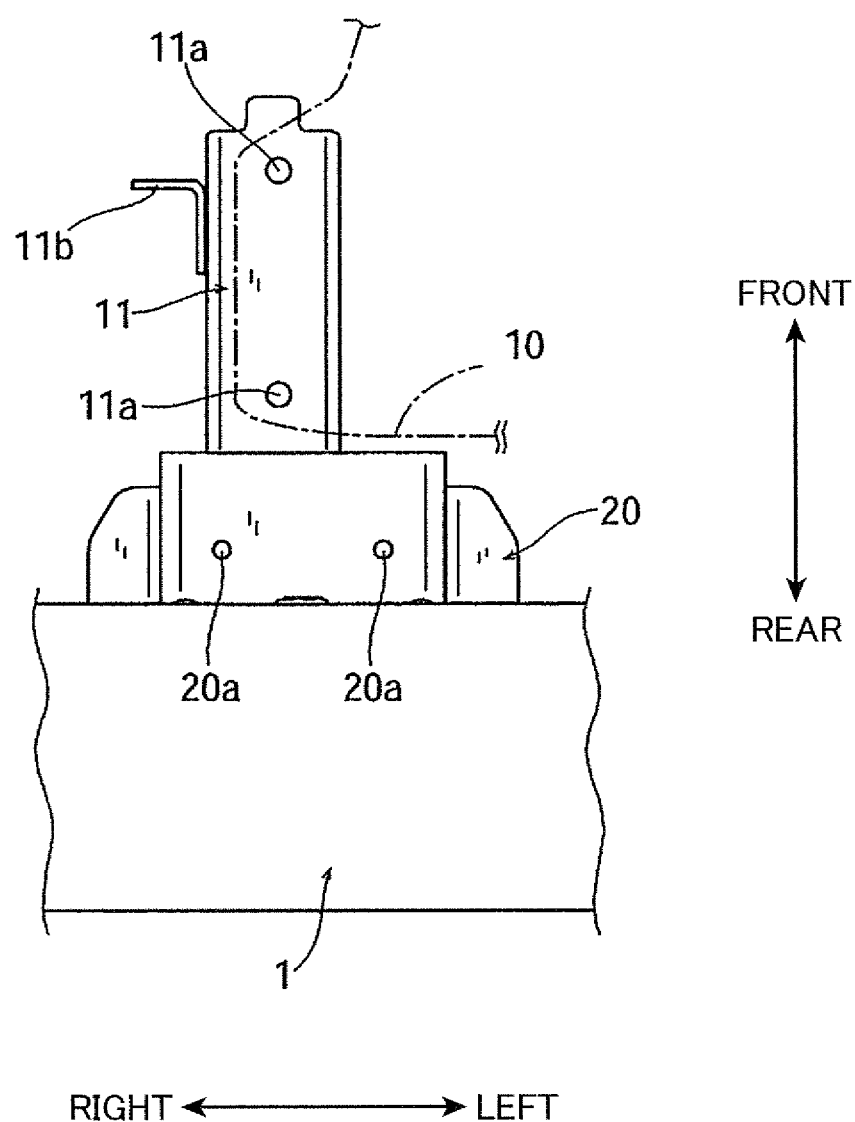
FIG. 6 is a view of the mount bracket from which the pedal-backward-preventive bracket illustrated in FIG. 5 is removed.

The pedal-backward-preventive bracket 30 is made by, for example, working an iron-based metal plate. The pedal-backward-preventive bracket 30 is placed on a bottom face of the base bracket 20 and detachably fixed to the base brackets 20 by second fasteners 31, such as bolts and nuts. The second fasteners 31 are handled (turned) from below. In FIG. 6, reference sign 20a indicates a hole provided in the base bracket 20 used for the second fastener 31.

Figure 4:
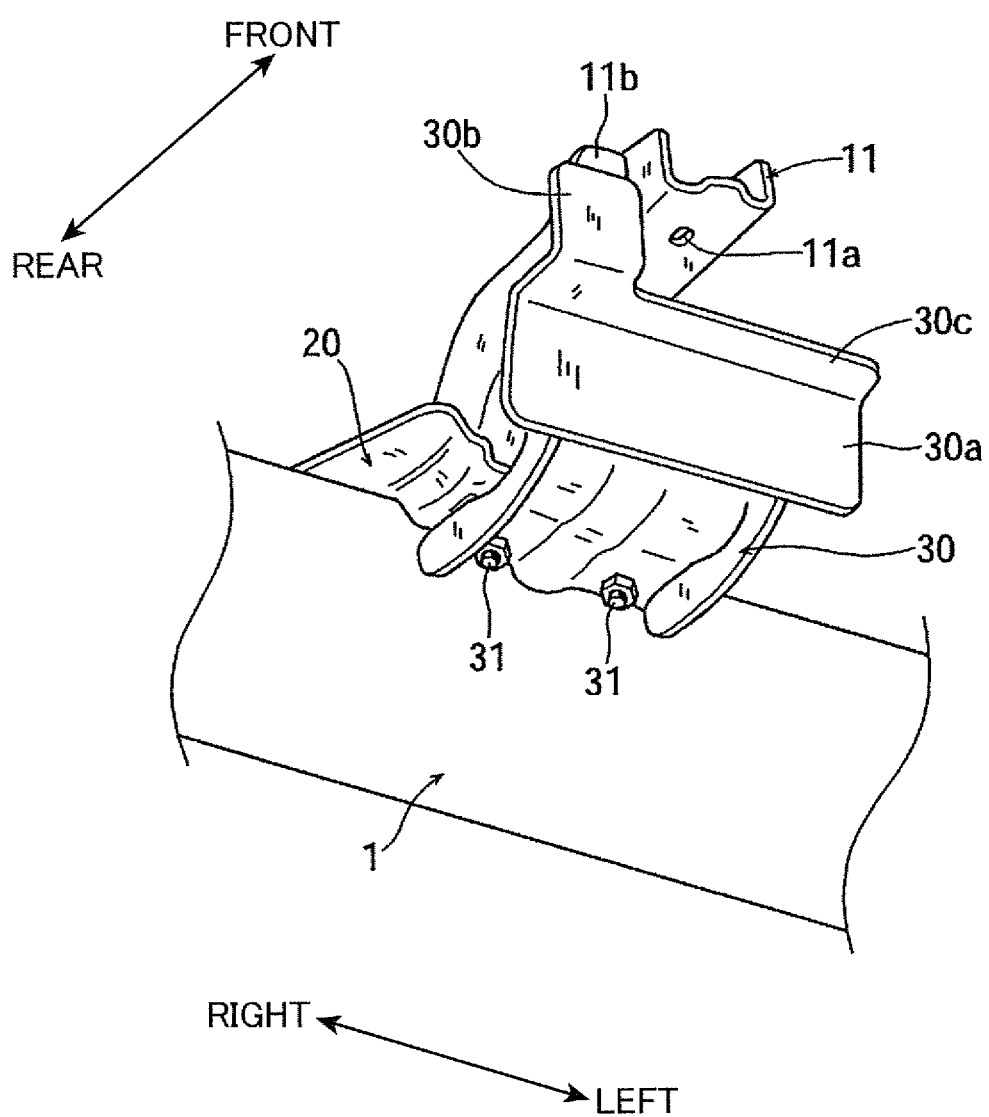
FIG. 4 is a bottom perspective view illustrating a relationship between the mount bracket and the pedal-backward-preventive bracket.
Figure 5:
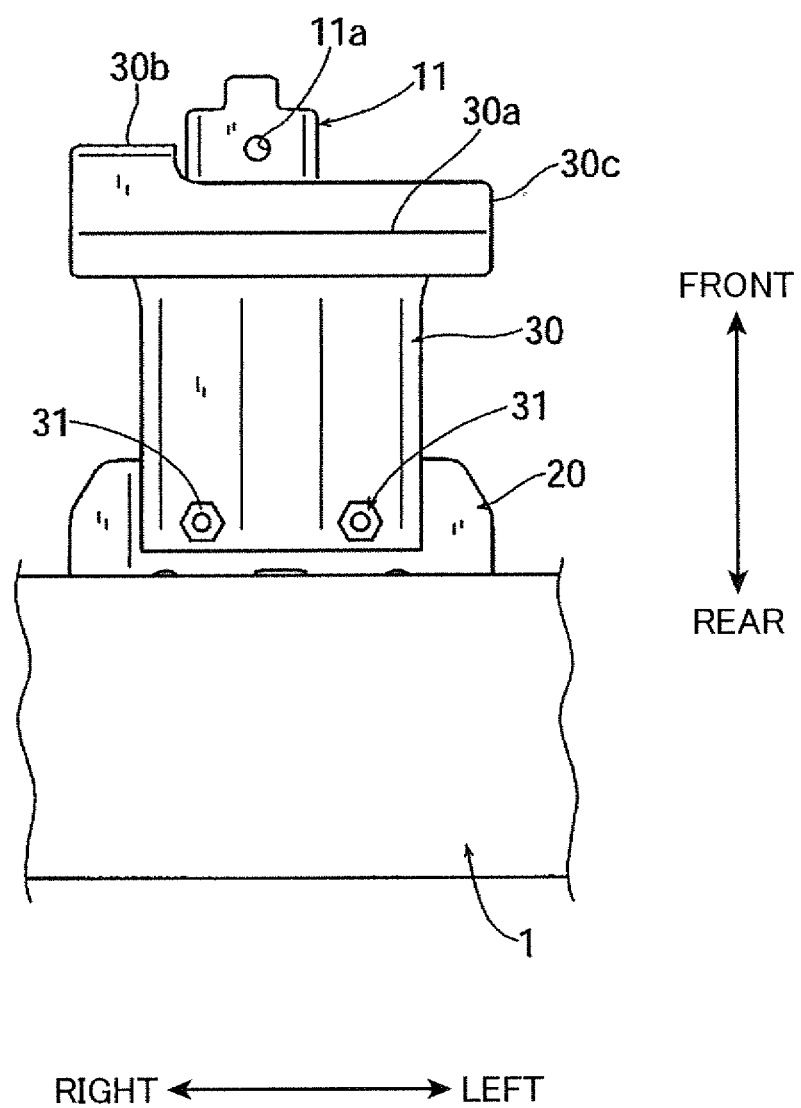
FIG. 5 is a bottom view illustrating a relationship between the mount bracket and the pedal-backward-preventive bracket.

As illustrated in FIGS. 3 to 5, the pedal-backward-preventive bracket 30 extends forward from the base bracket 20, and the pedal-backward-preventive bracket 30 has a front end provided with an abut portion 30a having a substantially flat face. As will be described later, a supporting portion of the braking pedal 50 abuts the abut portion 30a when the braking pedal 50 moves backward. In order that the supporting portion of the braking pedal 50 moving backward reliably abuts against the abut portion 30a even when being shifted in a right-and-left direction, the abut portion 30a has a width (a length in the vehicle width direction) sufficiently larger than a width of the mount bracket 11 and extends to below the head-up display 10.

The pedal-backward-preventive bracket 30 has a front end provided with a pusher 30b having a plate shape and extending in an up-and-down direction. The pusher 30b extends upwardly from a right end of a front extended portion 30c that slightly extends forward from a top end of the abut portion 30a.

The pusher 30b is positioned immediately in front of the pressure receiving portion 11b of the mount bracket 11. When a large rearward load acts on the pedal-backward-preventive bracket 30, the rearward load is transferred to the pressure receiving portion 11b of the mount bracket 11 via the pusher 30b. In this example, the pusher 30b and the pressure receiving portion 11b constitute a load transfer portion of the present invention.

In FIG. 1, a dashboard panel 40 is provided in front of the instrumental panel support member 1 to partition an engine room from a vehicle compartment. The braking pedal 50 is supported on the dashboard panel 40. A proximal end portion of the braking pedal 50 is swingably supported on a bracket 51 fixed to the dashboard panel 40 by a support pin 52. The support pin 52 is held in a support hole 51a provided in the bracket 51. A lower portion of the support hole 51a is partially cut out to cause the support pin 52 to come out of the support hole 51a when a force greater than or equal to a predetermined value acts on the support pin 52 from above, thereby allowing the braking pedal 50 to fall.

A swing lever 54 is swingably supported on the bracket 51 by a pin 53. Under a normal operation, an end 54a of the swing lever 54 is positioned immediately in front of the abut portion 30a of the pedal-backward-preventive bracket 30 described above. The other end 54b of the swing lever 54 is positioned immediately above the support pin 52. In this example, the bracket 51 and the swing lever 54 correspond to the "supporting portion" of the present invention.

In the configuration described above, when a forward collision occurs, the braking pedal 50 moves backward together with the bracket 51 and the end 54a of the swing lever 54 abuts the abut portion 30a of the pedal-backward-preventive bracket 30. The swing lever 54 thereby swings about the pin 53 by a reaction force given by the pedal-backward-preventive bracket 30 such that the other end 54b moves downward. Swinging of the swing lever 54 causes the support pin 52 to come out of the support hole 51a and allows the braking pedal 50 to fall downward. The fall of the braking pedal 50 prevents the braking pedal 50 from moving backward more than or equal to a predetermined dimension, and thus a leg of a driver is protected.

Meanwhile, the rearward load acts on the pedal-backward-preventive bracket 30 via the swing lever 54. The rearward load is received by the instrumental panel support member 1 via the pedal-backward-preventive bracket 30. The rearward load is input to the pressure receiving portion 11b of the mount bracket 11 through the pusher 30b of the pedal-backward-preventive bracket 30 and received by the instrumental panel support member 1 via the mount bracket 11. That is, the rearward load generated by the vehicle forward collision is efficiently distributed and transferred in two directions, namely, upward and downward directions.

As described above, the rearward load that is input to the pedal-backward-preventive bracket 30 is also distributed to the mount bracket 11 to be transferred to the instrumental panel support member 1. This greatly improves impact resistance of the pedal-backward-preventive bracket 30. If the impact resistance is to be set to a conventional level, downsizing and weight reduction can be achieved by reducing a thickness of the pedal-backward-preventive bracket 30 since the rearward load is also distributed to the mount bracket 11. Thus, the increase in size and weight of the pedal-backward-preventive bracket 30 can be prevented or minimized and at the same time, sufficient impact resistance can be secured for the pedal-backward-preventive bracket 30.

Now, removing of the head-up display 10 from inside the instrumental panel 2 for checking or replacing the head-up display 10 will be described. First, by handling the second fastener 31 from below, the pedal-backward-preventive bracket 30 is removed from the base bracket 20. Then, the first fastener 12 is handled from below to release the fixation of the head-up display 10 with respect to the mount bracket 11.

The head-up display 10 released from the mount bracket 11 can be handled from below and taken out through a space K (see FIG. 1) between the dashboard panel 40 and the instrumental panel support member 1 to a floor of the vehicle compartment.

To reassemble the head-up display 10 in the vehicle, the procedure described above is performed in the reverse order. When a lower panel of the instrumental panel 2 hampers mounting or dismounting of the head-up display 10, the procedure of mounting or dismounting is performed with the lower panel removed in advance. If the steering shaft hampers the procedure, the steering shaft is removed from the instrumental panel support member 1 in advance and laid on the floor of the vehicle compartment.

Second Embodiment

Figure 7:
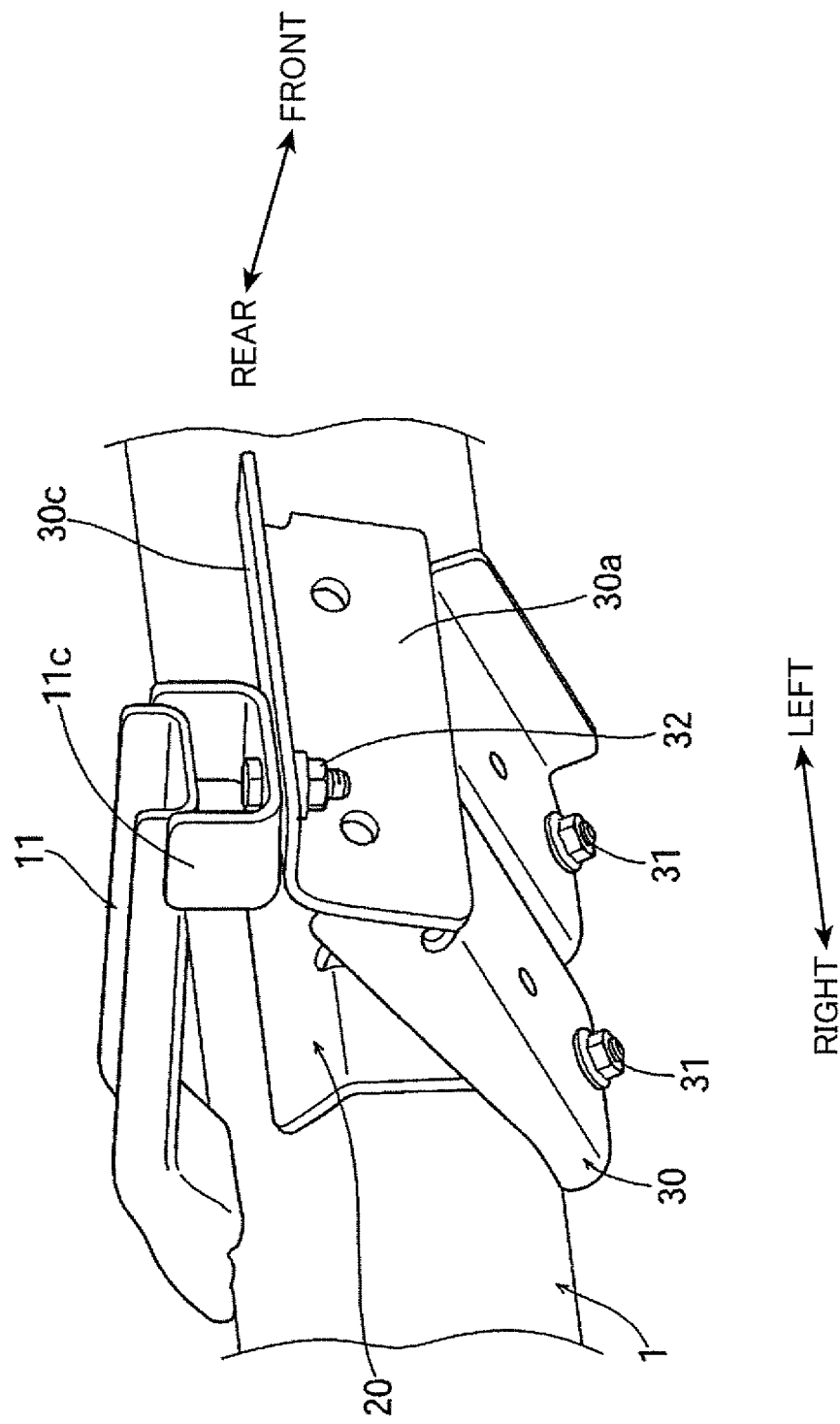
FIG. 7 is a right perspective view of a mount bracket and an pedal-backward-preventive bracket (a second embodiment).
Figure 8:
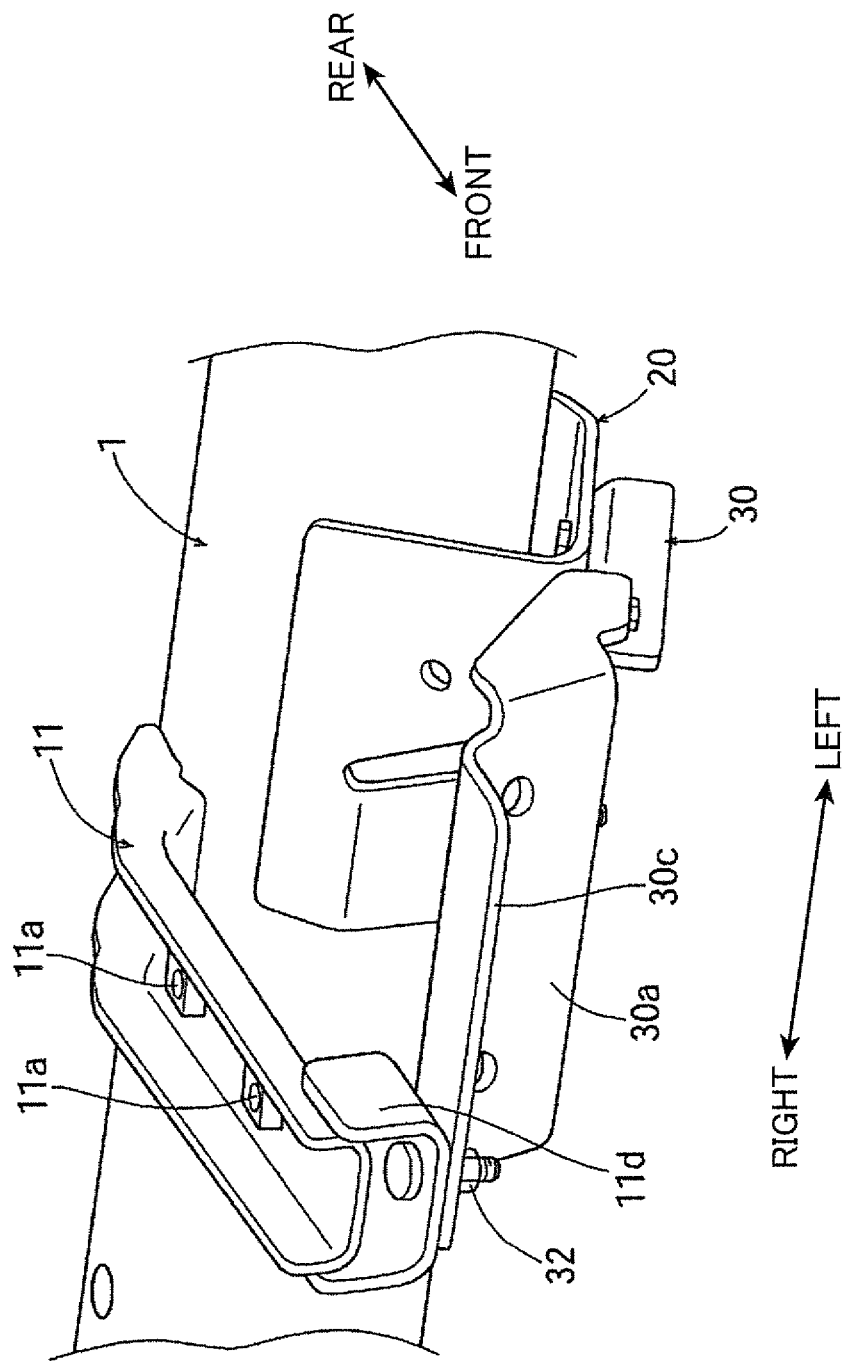
FIG. 8 is a left top perspective view of the mount bracket and the pedal-backward-preventive bracket (the second embodiment).

FIGS. 7 and 8 illustrate a second embodiment of the present invention. The component same as the first embodiment is appended with the same reference sign and description thereof is not repeated (the same can be said for a third embodiment illustrated in FIGS. 9 and 10).

In the second embodiment, a front extended portion 30c of an pedal-backward-preventive bracket 30 is detachably fixed to a bottom face of a front end of a mount bracket 11. In more detail, a fixing portion 11c is provided on the bottom face of the front end of the mount bracket 11, and the front extended portion 30c is fixed to the fixing portion 11c by a third fastener 32. The third fastener 32 is also handled from below. The fixing portion 11c, of the mount bracket 11, fixed by the third fastener 32 is provided by fixing a mounting member to the mount bracket 11 by welding, for example, the mounting member being separately prepared and having a U-shape in a front view.

Third Embodiment

Figure 9:
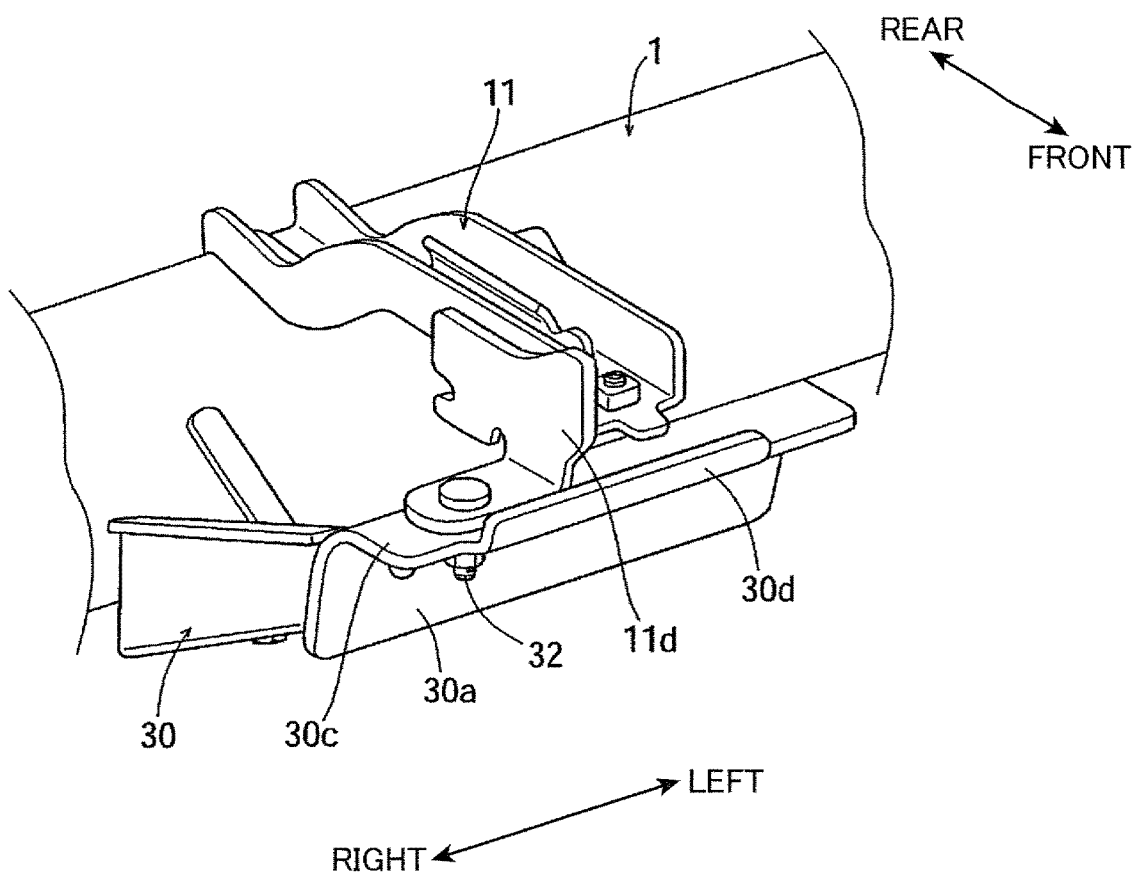
FIG. 9 is a right top perspective view of a mount bracket and an pedal-backward-preventive bracket (a third embodiment).
Figure 10:
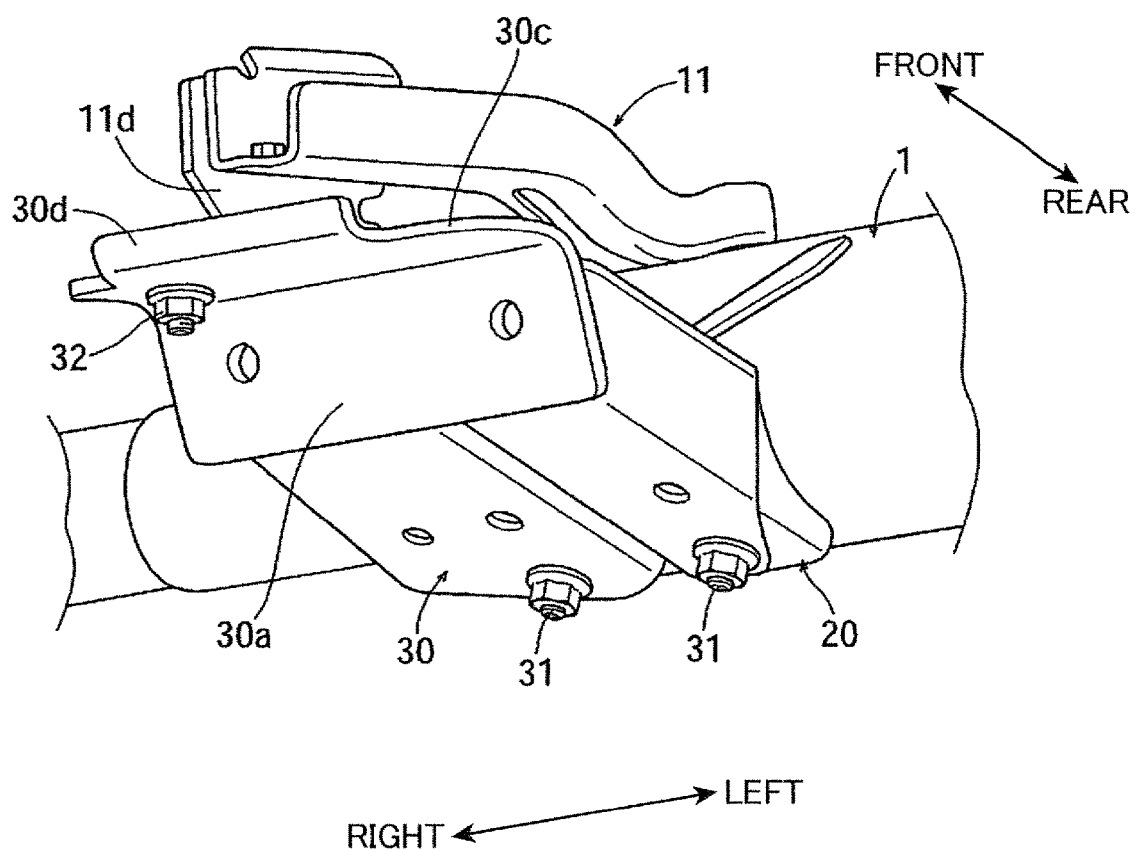
FIG. 10 is a left bottom perspective view of the mount bracket and the pedal-backward-preventive bracket (the third embodiment).

FIGS. 9 and 10 illustrate a third embodiment of the present invention. In the present embodiment, a front end of an pedal-backward-preventive bracket 30 and a front end of a mount bracket 11 are detachably fixed to each other by a third fastener 32. In more detail, a fixing portion 11d is provided on a right side face of the front end of the mount bracket 11, and a front extended portion 30c is fixed to the fixing portion 11d by the third fastener 32. In the present embodiment, the fixing portion 11d fixed to the mount bracket 11 by the third fastener 32 is provided by integrating an mounting member extending in the vehicle width direction and having an L-shape in a rear view with the mount bracket 11 by welding, for example. The fixing portion 11d is placed on a top face of the front extended portion 30c of the pedal-backward-preventive bracket 30.

Furthermore in the third embodiment, the pedal-backward-preventive bracket 30 has an upright portion 30d that extends upward by a short distance from the front end of the front extended portion 30c. The upright portion 30d is located immediately in front of the fixing portion 11d of the mount bracket 11. With such a configuration, a load is not only transferred through the third fastener 32 to the fixing portion 11d but also through the upright portion 30d to the fixing portion 11d, and thereby a load is further efficiently transferred from the pedal-backward-preventive bracket 30 to the mount bracket 11.

The present invention is not limited to the embodiments described above. The embodiments can suitably be modified within the scope described by the claims. The pedal-backward-preventive bracket 30 may directly be fixed to the instrumental panel support member 1 by a fastener without using the base bracket 20. A control pedal that is to be prevented from moving backward is not necessarily a braking pedal but may be an accelerator pedal or a clutch pedal. It goes without saying that an object of the present invention is not limited to the object described above but may implicitly include an object that is substantially preferable or an object described as an advantage.

The present invention described above is summarized as below.

In the present invention, a rearward load input to the pedal-backward-preventive bracket is also distributed and transferred to the mount bracket on which the head-up display is mounted. That is, a vehicle interior structure according to the present invention includes an instrumental panel support member to which an instrumental panel is fixed, the instrumental panel support member extending in a vehicle width direction, a pedal-backward-preventive bracket against which a supporting portion of a control panel abuts when the control pedal controlled by a foot of a driver moves backward, the pedal-backward-preventive bracket being fixed to the instrumental panel support member, a mount bracket on which a head-up display is mounted, the mount bracket being fixed to the instrumental panel support member, and a load transfer portion that is provided between the pedal-backward-preventive bracket and the mount bracket to transfer a rearward load input to the pedal-backward-preventive bracket to the mount bracket via the supporting portion.

According to the structure described above, when a forward collision occurs, the rearward load input to the pedal-backward-preventive bracket is also distributed to the mount bracket and transferred to the instrumental panel support member. This greatly improves impact resistance of the pedal-backward-preventive bracket. If the impact resistance is to be set to a conventional level, downsizing and weight reduction can be achieved by reducing a thickness of the pedal-backward-preventive bracket since the rearward load is also distributed to the mount bracket. Thus, the increase in size and weight of the pedal-backward-preventive bracket can be prevented or minimized and at the same time, sufficient impact resistance can be secured for the pedal-backward-preventive bracket.

In the structure described above, the load transfer portion includes a pusher provided on the pedal-backward-preventive bracket, and a pressure receiving portion provided on the mount bracket and located immediately behind the pusher.

According to this structure, preferably, the load transfer portion can be simplified.

The pedal-backward-preventive bracket and the mount bracket are fixed to each other, and the load transfer portion serves as a fixing portion that fixes the pedal-backward-preventive bracket to the mount bracket.

According to this structure, a rearward load can efficiently be transferred to the mount bracket via fixing which is a very strong connecting method.

The load transfer portion is provided in a front portion, with regard to a front-and-rear direction of a vehicle, of the pedal-backward-preventive bracket.

According to this structure, preferably, the load transfer portion can be provided as close as possible to a place where a rearward load is input, and thus the rearward load is efficiently transferred to the mount bracket.

The pedal-backward-preventive bracket is longer in the vehicle width direction than the mount bracket.

According to this structure, backward movement of the control pedal is prevented even when the control pedal is shifted in the vehicle width direction. According to this structure, preferably, the load transfer portion can suitably be provided corresponding to the mount bracket provided at a preferable location in the vehicle width direction.

Furthermore, the head-up display is detachably mounted on the mount bracket by the first fastener handled from below, the pedal-backward-preventive bracket is detachably fixed to the instrumental panel support member by the second fastener handled from below, and a space is defined between the instrumental panel support member and a dashboard panel to allow the head-up display dismounted from the mount bracket to pass through the space while the pedal-backward-preventive bracket is removed from the instrumental panel support member.

According to this configuration, the head-up display can be dismounted and mounted from below through the space between the dashboard panel and the instrumental panel support member without an extensive work of dismounting the whole instrumental panel from the instrumental panel support member. This improves workability of maintaining the head-up display.

INDUSTRIAL APPLICABILITY

The present invention preferably secures safety when a forward collision occurs.

The invention claimed is:

1. A vehicle interior structure comprising:
an instrumental panel support member to which an instrumental panel is fixed, the instrumental panel support member extending in a vehicle width direction;
a pedal-backward-preventive bracket against which a supporting portion of a control pedal abuts when the control pedal controlled by a foot of a driver moves backward, the pedal-backward-preventive bracket being fixed to the instrumental panel support member;
a mount bracket on which a head-up display is mounted, the mount bracket being fixed to the instrumental panel support member; and
a load transfer portion that is provided between the pedal-backward-preventive bracket and the mount bracket to transfer a rearward load input to the pedal-backward-preventive bracket to the mount bracket via the supporting portion.

2. The vehicle interior structure according to claim 1, wherein
the load transfer portion includes a pusher provided on the pedal-backward-preventive bracket, and a pressure receiving portion provided on the mount bracket and located immediately behind the pusher.

3. The vehicle interior structure according to claim 1, wherein
the pedal-backward-preventive bracket and the mount bracket are fixed to each other, and
the load transfer portion is a fixing portion that fixes the pedal-backward-preventive bracket to the mount bracket.

4. The vehicle interior structure according to claim 1, wherein
the load transfer portion is provided in a front portion, with regard to a front-and-rear direction of a vehicle, of the pedal-backward-preventive bracket.

5. The vehicle interior structure according to claim 1, wherein
the pedal-backward-preventive bracket is longer in the vehicle width direction than the mount bracket.

6. The vehicle interior structure according to claim 1, wherein
the head-up display is detachably mounted on the mount bracket by a first fastener handled from below,
the pedal-backward-preventive bracket is detachably fixed to the instrumental panel support member by a second fastener handled from below, and
a space is defined between the instrumental panel support member and a dashboard panel to allow the head-up display dismounted from the mount bracket to pass through the space in a state where the pedal-backward-preventive bracket is removed from the instrumental panel support member.

7. A vehicle interior structure comprising:
an instrumental panel support member to which an instrumental panel is fixed, the instrumental panel support member extending in a vehicle width direction;
a pedal-backward-preventive bracket against which a supporting portion of a control pedal abuts when the control pedal controlled by a foot of a driver moves backward, the pedal-backward-preventive bracket being fixed to the instrumental panel support member;
a mount bracket on which a head-up display is mounted, the mount bracket being fixed to the instrumental panel support member; and
a load transfer portion that is provided between the pedal-backward-preventive bracket and the mount bracket to transfer a rearward load input to the pedal-backward-preventive bracket to the mount bracket via the supporting portion, wherein
the load transfer portion is provided in a front portion, with regard to a front-and-rear direction of a vehicle, of the pedal-backward-preventive bracket, and includes a pusher provided on the pedal-backward-preventive bracket, and a pressure receiving portion provided on the mount bracket and located immediately behind the pusher.

8. The vehicle interior structure according to claim 7, wherein
the pedal-backward-preventive bracket is longer in the vehicle width direction than the mount bracket.

9. The vehicle interior structure according to claim 7, wherein
the head-up display is detachably mounted on the mount bracket by a first fastener handled from below,
the pedal-backward-preventive bracket is detachably fixed to the instrumental panel support member by a second fastener handled from below, and
a space is defined between the instrumental panel support member and a dashboard panel to allow the head-up display dismounted from the mount bracket to pass through the space in a state where the pedal-backward-preventive bracket is removed from the instrumental panel support member.

10. A vehicle interior structure comprising:
an instrumental panel support member to which an instrumental panel is fixed, the instrumental panel support member extending in a vehicle width direction;
a pedal-backward-preventive bracket against which a supporting portion of a control pedal abuts when the control pedal controlled by a foot of a driver moves backward, the pedal-backward-preventive bracket being fixed to the instrumental panel support member;
a mount bracket on which a head-up display is mounted, the mount bracket being fixed to the instrumental panel support member; and
a load transfer portion that is provided between the pedal-backward-preventive bracket and the mount bracket to transfer a rearward load input to the pedal-backward-preventive bracket to the mount bracket via the supporting portion, wherein
the pedal-backward-preventive bracket and the mount bracket are fixed to each other, and
the load transfer portion is provided in a front portion, with regard to a front-and-rear direction of a vehicle, of the pedal-backward-preventive bracket, the load transfer portion being a fixing portion that fixes the pedal-backward-preventive bracket to the mount bracket.

11. The vehicle interior structure according to claim 10, wherein the head-up display is detachably mounted on the mount bracket by a first fastener handled from below, the pedal-backward-preventive bracket is detachably fixed to the instrumental panel support member by a second fastener handled from below, and a space is defined between the instrumental panel support member and a dashboard panel to allow the head-up display dismounted from the mount bracket to pass through the space in a state where the pedal-backward-preventive bracket is removed from the instrumental panel support member.

12. The vehicle interior structure according to claim 10, wherein the pedal-backward-preventive bracket is longer in the vehicle width direction than the mount bracket.

* * * * *